US010162953B2

(12) United States Patent
Noh et al.

(10) Patent No.: US 10,162,953 B2
(45) Date of Patent: Dec. 25, 2018

(54) USER CLASSIFICATION APPARATUS AND METHOD USING KEYSTROKE PATTERN BASED ON USER POSTURE

(71) Applicant: ELECTRONICS AND TELECOMMUNICATIONS RESEARCH INSTITUTE, Daejeon (KR)

(72) Inventors: Jong Hyouk Noh, Daejeon (KR); Seok Hyun Kim, Daejeon (KR); Soo Hyung Kim, Daejeon (KR); Seung Hyun Kim, Daejeon (KR); Sang Rae Cho, Daejeon (KR); Young Seob Cho, Daejeon (KR); Jin Man Cho, Daejeon (KR); Jung Yeon Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/232,565

(22) Filed: Aug. 9, 2016

(65) Prior Publication Data

US 2017/0199995 A1    Jul. 13, 2017

(30) Foreign Application Priority Data

Jan. 7, 2016 (KR) .................... 10-2016-0001969

(51) Int. Cl.
*G06F 21/31* (2013.01)
*H04W 12/06* (2009.01)
*H04W 12/08* (2009.01)

(52) U.S. Cl.
CPC .......... *G06F 21/316* (2013.01); *H04W 12/06* (2013.01); *H04W 12/08* (2013.01)

(58) Field of Classification Search
CPC ........ G06F 21/30; G06F 21/31; G06F 21/316; G06F 21/32; G06F 21/36; H04W 12/06; H04W 12/08; H04W 12/12
See application file for complete search history.

(56) References Cited

U.S. PATENT DOCUMENTS 8,508,481 B1 *  8/2013  Landry ................. G06F 3/0418
                                             345/168
2009/0049555 A1  2/2009  Cho et al.
(Continued)

FOREIGN PATENT DOCUMENTS

KR   10-2012-0134484 A   12/2012

OTHER PUBLICATIONS

Cristiano Giuffrida et al., "I Sensed It Was You: Authenticating Mobile Users with Sensor-Enhanced Keystroke Dynamics", DIMVA 2014, LNCS 8550, 2014, pp. 92-111, Springer International Publishing, Switzerland.

*Primary Examiner* — Jung W Kim
*Assistant Examiner* — Adrian Stoica

(57) ABSTRACT

A user classification apparatus and method using a keystroke pattern based on a user posture are provided. A user classification method using a keystroke pattern may include receiving keystroke data from a user, extracting feature information corresponding to a unique pattern of the user using the received keystroke data, comparing the extracted feature information to a pattern of a keystroke profile for each posture of the user pre-generated through training, and determining whether currently input keystroke data is data of a trained user based on a result of the comparing.

8 Claims, 7 Drawing Sheets

(56) References Cited

U.S. PATENT DOCUMENTS

| | | | |
|---|---|---|---|
| 2012/0098750 A1* | 4/2012 | Allen | G06F 3/023 |
| | | | 345/169 |
| 2014/0026210 A1 | 1/2014 | Chung et al. | |
| 2014/0207401 A1 | 7/2014 | Sung et al. | |
| 2014/0218315 A1 | 8/2014 | Jeong | |
| 2015/0186612 A1* | 7/2015 | Gartseev | G06F 19/3418 |
| | | | 702/19 |
| 2017/0153812 A1* | 6/2017 | Creager | G06F 3/04886 |

* cited by examiner

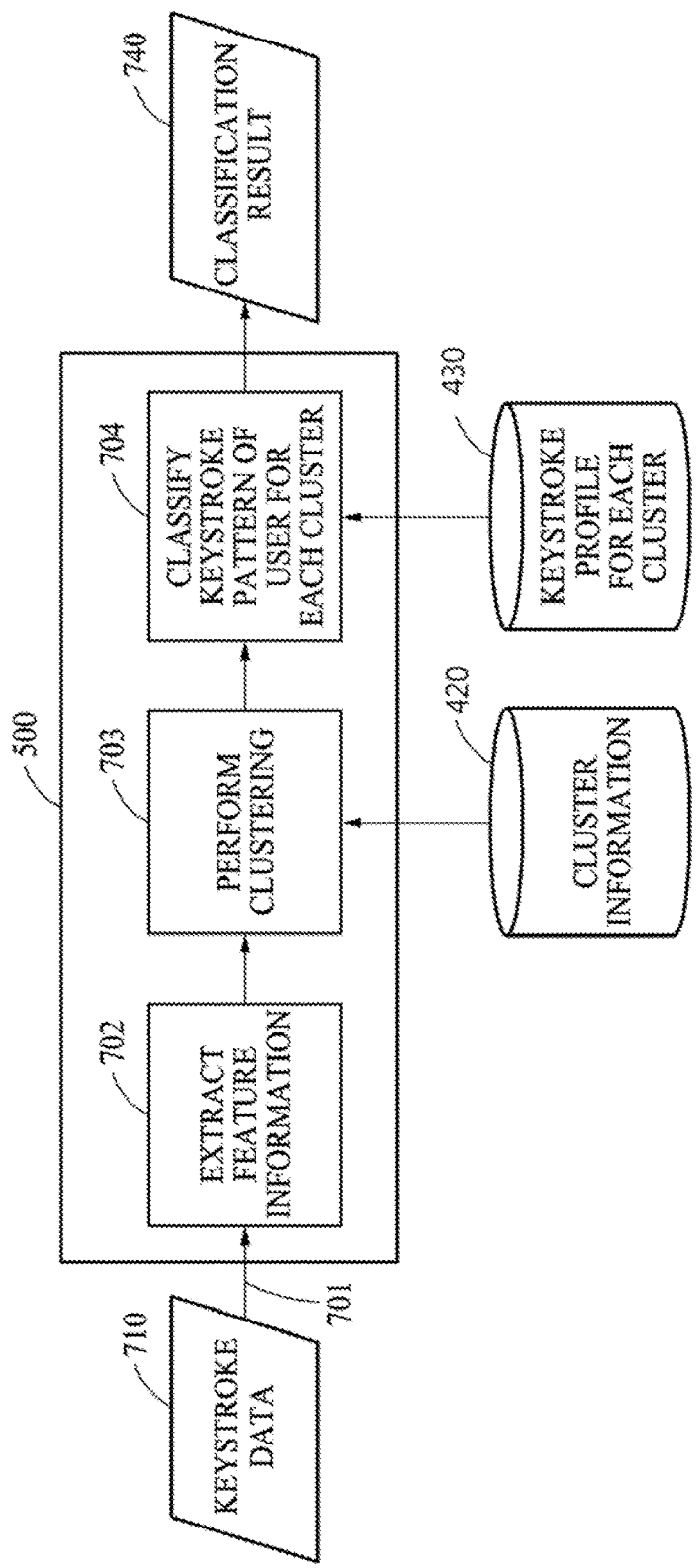

USER CLASSIFICATION APPARATUS AND METHOD USING KEYSTROKE PATTERN BASED ON USER POSTURE

CROSS-REFERENCE TO RELATED APPLICATIONS

This application claims the priority benefit of Korean Patent Application No. 10-2016-0001969 filed on Jan. 7, 2016, in the Korean Intellectual Property Office, the disclosure of which is incorporated herein by reference for all purposes.

BACKGROUND

1. Field

One or more example embodiments relate to a user classification apparatus and method using a keystroke pattern, and more particularly, to an apparatus and method for training a keystroke pattern based on a user posture and classifying a user based on the foregoing.

2. Description of Related Art

In authentication technology, a method using an identification (ID) and a password is still used, even though dictionary attacks occur and a user may repeatedly use a same password and an easily guessable password. To solve such issues, research on a method using bio-information for authentication is being actively conducted. However, a method using bio-information requires an additional device, such that the method is not easily adopted because it can give inconvenience and discomfort to a user.

As smartphones are actively used, demands on user authentication technology for purposes such as online banking and FinTech have increased. Although smartphones having a fingerprint recognition function are available and a method of authentication based on biorecognition has been introduced, a password input method is sill widely used. However, a password input may have a disadvantage that an attacker may easily find out the password when viewing the user terminal from an angle.

To overcome such disadvantage, a method using a user behavior feature has been introduced. The method uses a feature that recognizes users have different patterns of times for pressing and releasing keys to input passwords. When keystroke dynamics are used, it is difficult to copy a password even if the password is already known.

Research on keystroke dynamics has been conducted for a long period of time, and the relatively recent appearance of smartphones has regenerated significant interest in keystroke dynamics. Various sensors included in a smartphone may be useful for classifying a user pattern.

SUMMARY

Embodiments provide a method and apparatus for training a keystroke pattern based on a user posture and a keystroke pattern based on clustering in order to increase a success rate of user classification.

According to an aspect, there is provided a user classification method using a keystroke pattern, the method including receiving keystroke data from a user, extracting feature information corresponding to a unique pattern of the user using the received keystroke data, comparing the extracted feature information to a pattern of a keystroke profile for each posture of the user pre-generated through training, and determining whether the user is a pre-trained user based on a result of the comparing.

The keystroke data may be generated when the user presses a key, and the keystroke data may include time information of when a key is pressed and released and sensor information collected during a time corresponding to the time information.

According to another aspect, there is provided a keystroke pattern training method, the method including receiving keystroke data from a user, extracting feature information corresponding to a unique pattern of the user using the received keystroke data, and training a keystroke pattern for each posture of the user using the extracted feature information.

The training may include determining a posture of the user using the extracted feature information and a preset posture feature information and training the keystroke pattern for each determined posture of the user.

The trained keystroke pattern for each posture may be stored in a form of a keystroke profile for each posture.

The preset posture feature information may include information for classifying the posture of the user.

The keystroke data may be generated when the user presses a key, and the keystroke data may include time information of when a key is pressed and released and sensor information collected during a time corresponding to the time information.

According to still another aspect, there is provided a user classification method using a keystroke pattern, the method including receiving keystroke data from a user, extracting feature information corresponding to a unique pattern of the user using the received keystroke data, comparing the extracted feature information to a pattern of a keystroke profile for each cluster of the user pre-generated through training, and determining whether the user is a pre-trained user based on a result of the comparing.

The keystroke data may be generated when the user inputs a key, and the keystroke data may include time information of when a key is pressed and released and sensor information collected during a time corresponding to the time information.

According to a further aspect, there is provided a training method of a keystroke pattern, the method including receiving keystroke data from a user, extracting feature information corresponding to a unique pattern of the user using the received keystroke data, and training a keystroke pattern for each cluster of the user using the extracted feature information.

The training may include classifying the extracted feature information into a plurality of clusters based on data included in the extracted feature information, and training the keystroke pattern of the user for each classified cluster.

The keystroke pattern of the user trained for each classified cluster may be stored in a form of a keystroke profile for each cluster.

Additional aspects of example embodiments will be set forth in part in the description which follows and, in part, will be apparent from the description, or may be trained by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 is a flowchart illustrating a user classification method using a keystroke pattern for each posture of a user according to an example embodiment.

DETAILED DESCRIPTION

Figure 1:
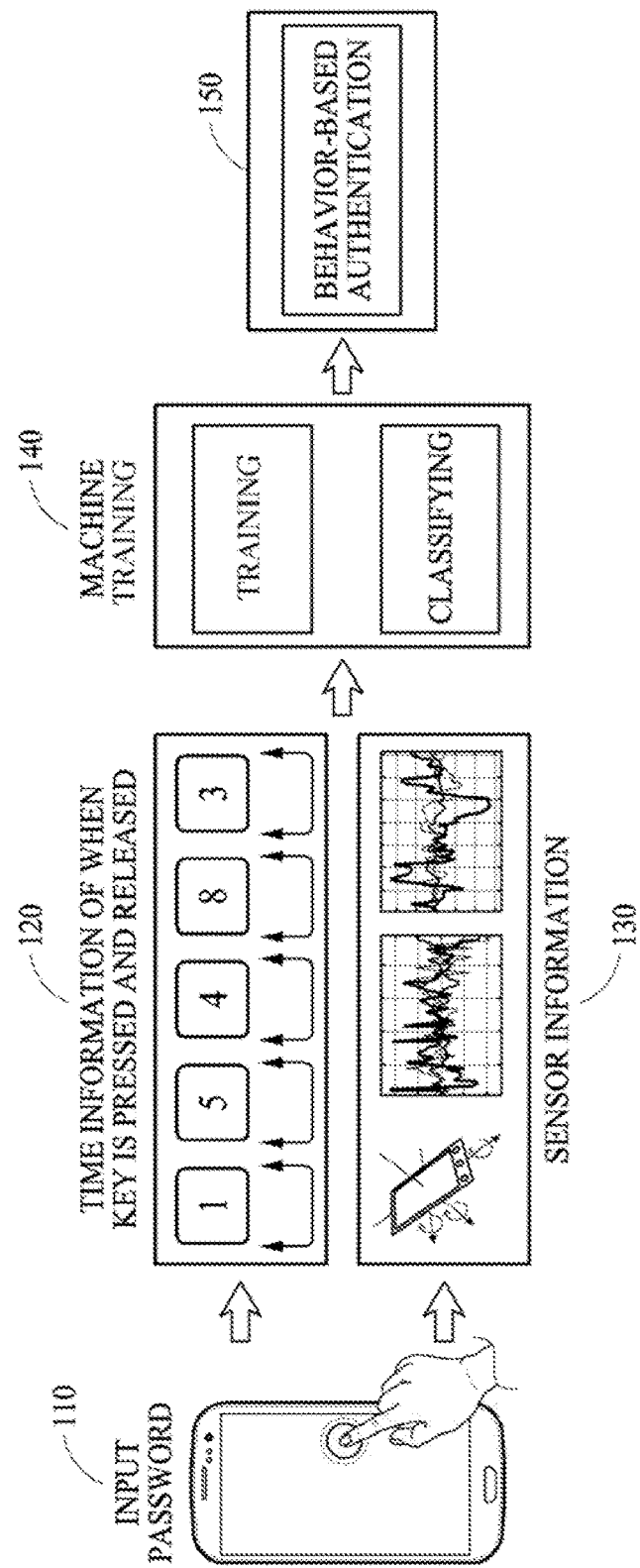
FIG. 1 is a diagram illustrating a classification method using a keystroke pattern according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and or components, but do not preclude the presence or addition of one or more other features, integers, steps, operations, elements, components, and/or clusters thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram illustrating a classification method using a keystroke pattern according to an example embodiment.

In operation 110, a user inputs a password using a user terminal such as a smartphone. When the user inputs the password, a keystroke pattern of the user may be extracted using time information 120 of when each key is pressed and released and a plurality pieces of sensor information 130 collected from a plurality of sensors included in the user terminal.

A unique keystroke pattern of the user may be trained using a training function in operation 140 based on the extracted keystroke pattern of the user.

Subsequently, when the user inputs the password for user classification, it is determined whether the user is an existing user by comparing the keystroke pattern of the user with respect to the password input in a classifying function in operation 140 to a keystroke pattern of a pre-trained user. Concisely, based on a result of the comparing that the keystroke pattern of the user is similar to the keystroke pattern of the pre-trained user, it is determined that the user is an existing user. Here, behavior (posture)-based authentication 150 may be used as one of authentication methods.

Figure 2:
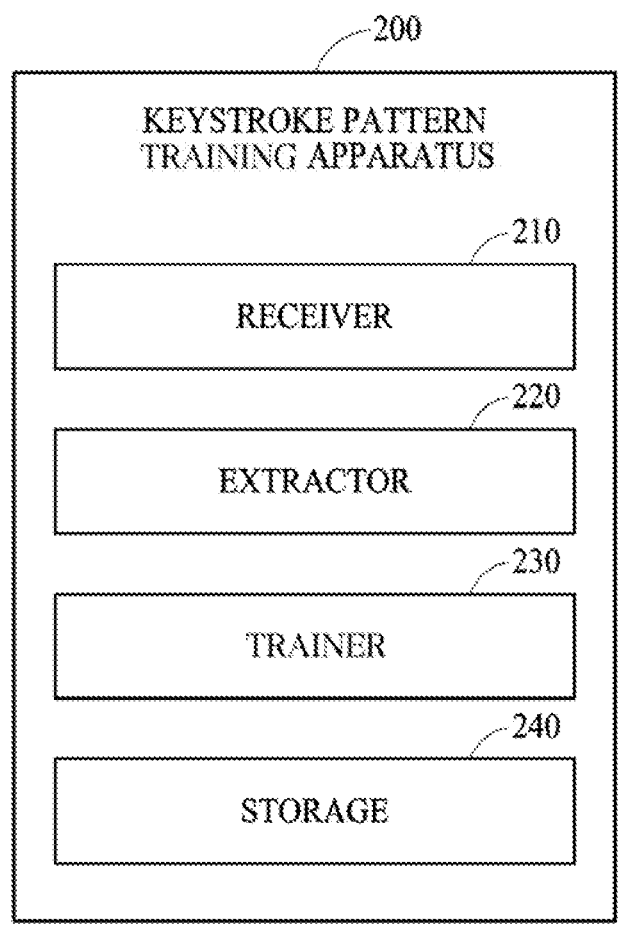
FIG. 2 is block diagram illustrating a keystroke pattern training apparatus according to an example embodiment.

FIG. 2 is block diagram illustrating a keystroke pattern training apparatus according to an example embodiment.

A keystroke pattern of a user may differ from a posture of the user. A current posture performed by the user may be one of various postures, for example, a walking posture, a sitting posture, a lying down posture, and a putting a smartphone on a table posture. Thus, the keystroke pattern of the user may differ according to a posture.

Thus, a success rate of user classification may be increased by using the keystroke pattern that differs according to the posture of the user.

Here, information the user inputs into a user terminal such as a smartphone is not limited to a short and fixed expression such as a password. The information may include an appointed and predetermined expression, or a long and unconstrained expression.

A keystroke pattern training apparatus 200 includes a receiver 210, an extractor 220, a trainer 230, and a storage 240. The receiver 210 receives keystroke data from the user. The keystroke data is information generated when the user presses a key of the user terminal such as the smartphone. The keystroke data includes time information of when a key is pressed and released and sensor information collected from a plurality of sensors included in the user terminal while the user presses and releases the key.

The extractor 220 extracts feature information corresponding to a unique pattern of the user using the keystroke data received from the user. Here, the extracted feature information may include data for a posture performed by the user when the user performs a keystroke and data for a keystroke pattern.

When the feature information extracted through the extractor 220 is used, the posture of the user may be classified and the keystroke pattern of the user may be represented.

The trainer 230 trains the keystroke pattern of the user using the extracted feature information through the extractor 220. Here, the trained keystroke pattern may have uniqueness and consistency.

The uniqueness is a concept related to a degree of a difference between keystroke patterns input by an actual user for training and keystroke patterns input by potential attackers. As the degree of the difference between a feature of each of the keystroke patterns used for training and the keystroke patterns of potential attackers increases, the success rate of user classification may increase.

The consistency is a concept related to a degree of a similarity between the keystroke patterns input by the actual user for training and the keystroke patterns input to the keystroke pattern training apparatus 200 by the actual user. Thus, making it possible for the keystroke patterns used for training to be maximally similar to the keystroke patterns input for user authentication may be a significant factor that increases the success rate of user classification.

Here, the keystroke pattern trained through the trainer 230 may be trained by two methods. The first method is used when posture feature information that classifies the posture of the user is known in advance. The second method classifies the keystroke patterns of the user by clustering feature information without directly classifying the posture of the user.

Figure 3:
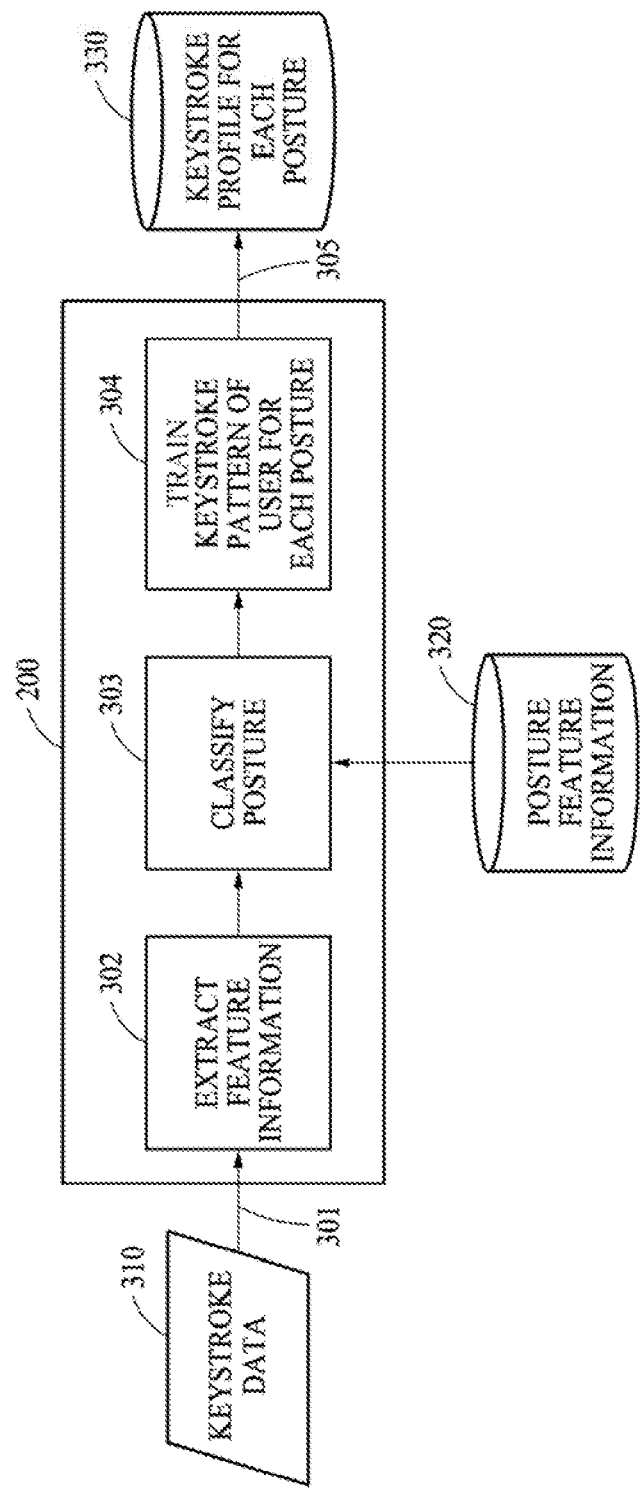
FIG. 3 is a flowchart illustrating a method of training a keystroke pattern for each posture of a user according to an example embodiment.
Figure 4:
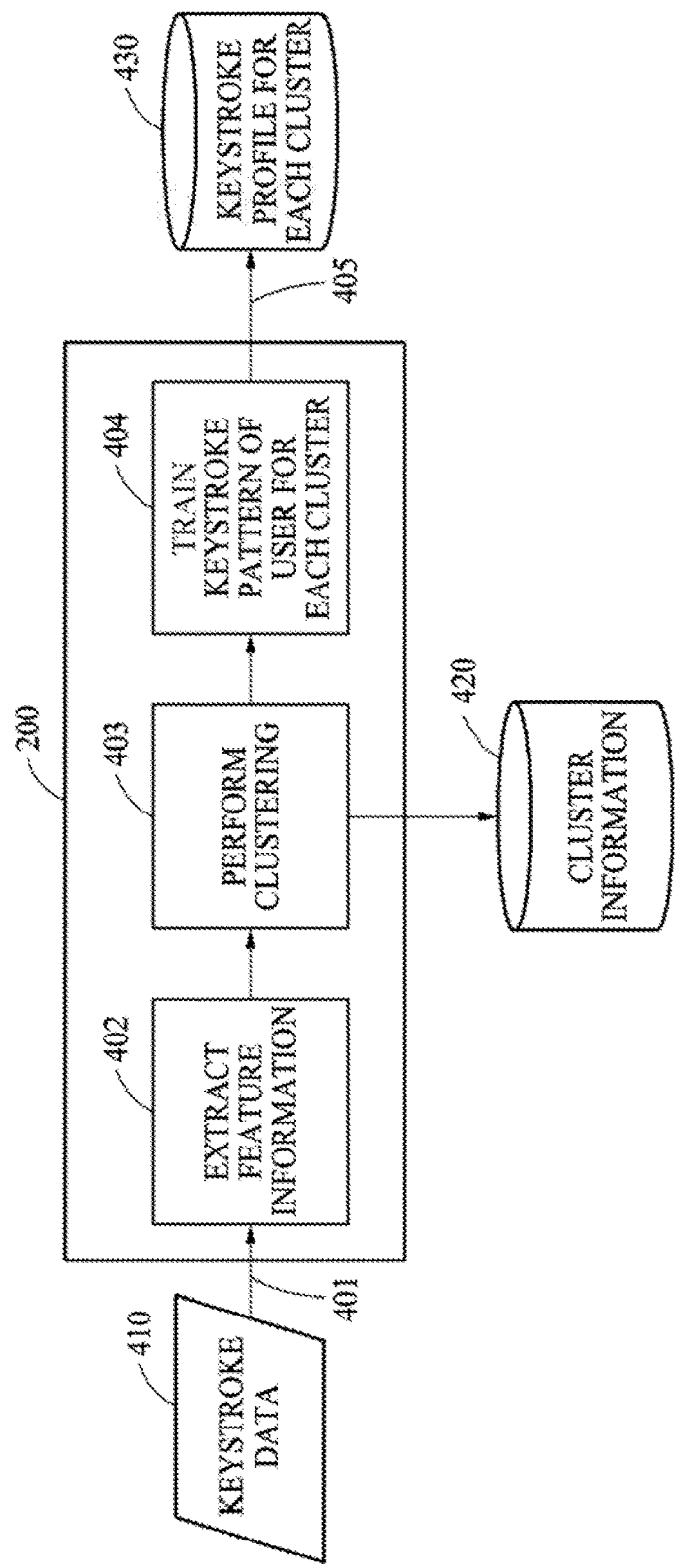
FIG. 4 is a flowchart illustrating a method of training a keystroke pattern for each cluster of a user according to an example embodiment.

Detailed descriptions of two methods of training the keystroke pattern of the user will be provided with reference to FIGS. 3 and 4.

The storage 240 stores the keystroke patterns of the user trained through the trainer 230. The keystroke patterns of the user stored in the storage 240 may be used when user authentication is required.

FIG. 3 is a flowchart illustrating a method of training a keystroke pattern for each posture of a user according to an example embodiment.

In operation 301, the keystroke pattern training apparatus 200 receives keystroke data 310 from a user. The keystroke data 310 is information generated when the user presses a key of a user terminal such as a smartphone. In more detail, the keystroke data 310 includes time information of when a key is pressed and released and sensor information collected from a plurality of sensors included in the user terminal while the user presses and releases the key. Here, the keystroke data 310 for each posture may be collected at plurality of times in order to increase a success rate of classification.

In operation 302, the keystroke pattern training apparatus 200 extracts feature information corresponding to a unique pattern of the user using the received keystroke data 310. Here, the extracted feature information includes data for a posture performed by the user when the user performs keystroke and data for a keystroke pattern.

When the feature information extracted through the keystroke pattern training apparatus 200 is used, the posture of the user may be classified and the keystroke pattern of the user may be represented.

In operation 303, the keystroke pattern training apparatus 230 classifies the posture of the user using the feature information extracted in operation 302. In more detail, the keystroke pattern training apparatus 200 classifies the posture of the user using the extracted feature information and preset posture feature information 320.

The posture feature information 320 is data generated depending on predetermined postures commonly performed by general resets performing keystrokes using user terminals such as smartphones. Accordingly, various pieces of data having different features may be generated based on various postures performed by the general users, for example, walking, sitting or lying down postures.

The keystroke pattern training apparatus 200 searches for a posture when the user performs a keystroke by comparing the posture feature information 320 to the extracted feature information.

The posture feature information 320 may be collected in advance. The posture feature information 320 may include information independent from a user to train a keystroke pattern.

In addition, the posture feature information 320 is stored in a database included in the keystroke pattern training apparatus 200 or in an additional database.

In operation 304, the keystroke pattern training apparatus 200 trains the keystroke pattern of the user for each posture classified in operation 303. In an example, when the user performing a keystroke is walking the keystroke pattern training apparatus 200 trains the extracted feature information as the keystroke pattern corresponding to a walking posture.

In another example, when the user performing a keystroke is lying down, the keystroke pattern training apparatus 200 trains the extracted feature information as the keystroke pattern corresponding to a lying down posture.

In operation 305, the keystroke pattern trained for each posture is stored in a form of a keystroke profile 330. When a training process is performed a plurality of times, newly extracted feature information may be combined with the trained and stored keystroke profile 330 for each posture, thereby training is performed.

Identical to the posture feature information 320, the keystroke pattern for each posture stored in the form of a keystroke profile 330 for each posture may be stored in the database included in the keystroke pattern training apparatus 200 or the additional database.

FIG. 4 is a flowchart illustrating a method of training a keystroke pattern for each cluster of a user according to an example embodiment.

In operation 401, the keystroke pattern training apparatus 200 receives keystroke data 410 from a user. The keystroke data 410 is information generated when the user presses a key of a user terminal such as a smartphone. In more detail, the keystroke data 410 includes time information of when a key is pressed and released and sensor information collected from a plurality of sensors included in the user terminal while the user presses and releases the key. Here, the keystroke data 410 for each posture may be collected a plurality of times in order to increase a success rate of classification.

In operation 402, the keystroke pattern training apparatus 200 extracts feature information corresponding to a unique pattern of the user using the received keystroke data 410.

In operation 403, the keystroke pattern training apparatus 200 performs clustering on the extracted feature information based on data included in the extracted feature information.

The keystroke pattern training apparatus 200 stores cluster information 420 obtained by classifying the extracted feature information into the clusters in a database included in the keystroke pattern training apparatus 200 or an additional database.

In operation 404, the keystroke pattern training apparatus 200 trains a keystroke pattern of the user for each cluster classified in operation 403.

In operation 405, the keystroke pattern of the user trained for each cluster may be stored in a form of a keystroke profile 430 for each cluster. When a training process is performed a plurality of times, newly extracted feature information may be combined with the trained and stored keystroke profile 430 for each cluster, thereby training is performed.

Identical to the cluster information, the keystroke pattern for each cluster stored in the form of the keystroke profile 430 for each cluster is stored in the database included in the keystroke pattern training apparatus 200 or the additional database.

The method of training the keystroke pattern is described with reference to FIGS. 3 and 4. FIGS. 3 and 4 describe that the training method is changed based on whether posture feature information that classifies the posture of the user is present.

Although the keystroke pattern training apparatus 200 trains the keystroke pattern using the aforementioned two methods separately, the keystroke pattern training apparatus 200 also trains the keystroke pattern using the two methods together.

Figure 5:
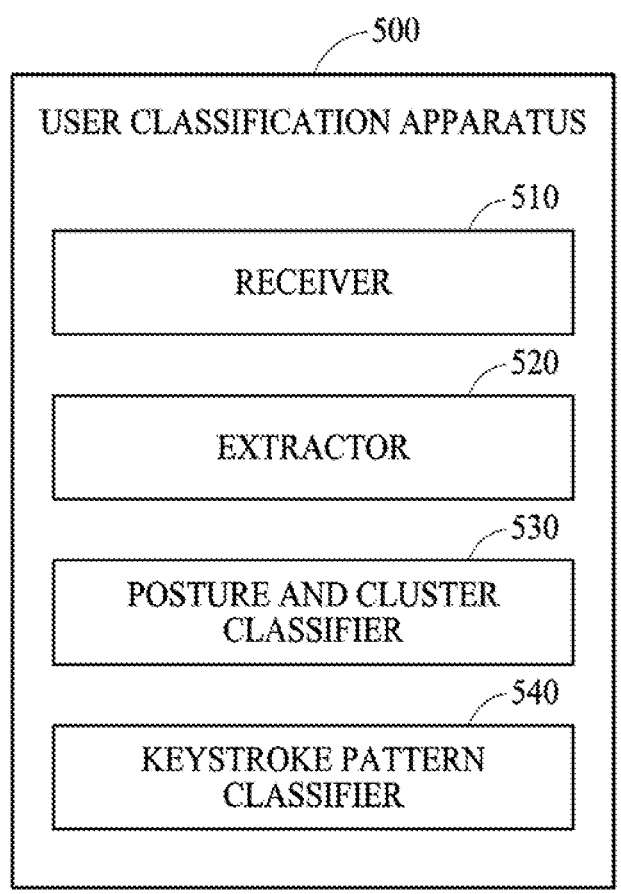
FIG. 5 is a block diagram illustrating a user classification apparatus according to an example embodiment.

FIG. 5 is a block diagram illustrating a user classification apparatus according to an example embodiment.

A user classification apparatus 500 includes a receiver 510, an extractor 520, a posture and cluster classifier 530, and a keystroke pattern classifier 540. The receiver 510 receives keystroke data. The keystroke data is information generated when a user presses a key of a user terminal such as a smartphone. In more detail, the keystroke data includes time information of when a key is pressed and released and sensor information collected from a plurality of sensors included in the user terminal while the user presses and releases the key.

The extractor 520 extracts feature information corresponding to a unique pattern of the user using the keystroke data received from the user. When the extracted feature information is used, the keystroke pattern of the user is extracted.

The posture and cluster classifier 530 compares the keystroke pattern of the user extracted through the extractor 520 to a pre-trained keystroke pattern for each posture of the user or a keystroke pattern for each cluster of the user.

The keystroke pattern classifier 540 determines whether the user is an existing user based on a result of a comparison of the posture and cluster classifier 530. The keystroke pattern classifier 540 measures a similarity between the keystroke pattern of the user extracted by the extractor 520 and a pre-trained pattern of a keystroke profile for each posture of the user or a pattern of a keystroke profile for each cluster.

When the measured similarity is greater than or equal to a threshold, the user classification apparatus 500 classifies the user as a trained user. When the measured similarity is less than or equal to the threshold, the user classification apparatus 500 classifies the user as an untrained user.

Figure 6:
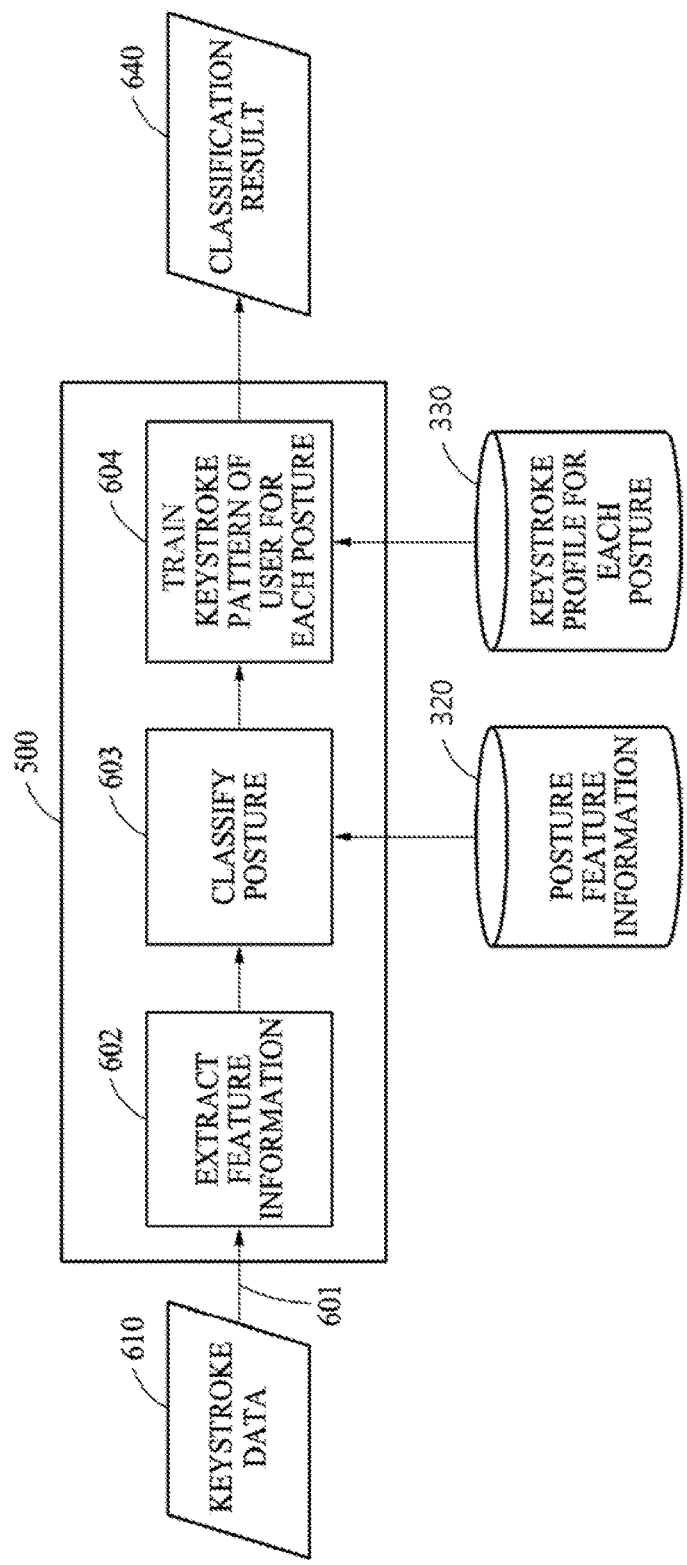
FIG. 6 is a flowchart illustrating a user classification method using a keystroke pattern for each posture of a user according to an example embodiment.

Detailed descriptions of the user classification method will be provided with reference to FIGS. 6 and 7.

FIG. 6 is a flowchart illustrating a user classification method using a keystroke pattern for each posture of a user according to an example embodiment.

In operation 601, the user classification apparatus 500 receives keystroke data 610 from a user. The keystroke data 610 is information generated when the user presses a key of a user terminal such as a smartphone. In detail, the keystroke data 610 includes time information of when a key is pressed and released and sensor information collected from a plurality of sensors included in the user terminal while the user presses and releases the key. Here, the keystroke data 610 is a single piece of data.

In operation 602, the User classification apparatus 500 extracts feature information corresponding to a unique pattern of the user using the received keystroke data 610. Here, the extracted feature information includes data for a posture performed by the user when the user performs a keystroke and data for a keystroke pattern.

When the feature information extracted through the user classification apparatus 500 is used, the posture of the user may be classified and the keystroke pattern of the user may be represented.

In operation 603, the user classification apparatus 500 classifies the posture of the user using the feature information extracted in operation 602. In more detail, the user classification apparatus 500 classifies the posture of the user using the extracted feature information and preset posture feature information 320.

The posture feature information 320 is data generated depending on predetermined postures commonly performed by general users performing keystrokes using user terminals such as smartphones. Accordingly, various pieces of data having different features may be generated based on various postures performed by the general users, for example, walking, sitting, or lying down postures.

The user classification apparatus 500 searches for a posture when the user performs a keystroke by comparing the posture feature information 320 to the extracted feature information.

The posture feature information 320 may be collected in advance. The posture feature information 320 may include information independent from a user to train a keystroke pattern.

In addition, the posture feature information 320 is stored in a database includes in the user classification apparatus 500 or in an additional database.

In operation 604, the user classification apparatus 500 selects a keystroke profile corresponding to a posture of a current user from a keystroke profile 330 for each posture. The user classification apparatus 500 classifies the user using the selected keystroke profile and the feature information extracted in operation 602. In more detail, the user classification apparatus 500 determines whether the extracted feature information is similar to a pattern of the selected keystroke profile.

Based on a result of the comparing that the extracted keystroke pattern of the user is similar to the pattern of the selected keystroke profile, a classification result 640 is the user currently inputting a key is a pre-trained user.

Based on the result of the comparing that the extracted keystroke pattern of the user is not similar to the pattern of the selected keystroke profile, the classification result 640 is the user currently inputting the key is not a pre-trained user.

FIG. 7 is a flowchart illustrating a user classification method using a keystroke pattern for each posture of a user according to an example embodiment.

In operation 701, the user classification apparatus 500 receives keystroke data 710 from a user. The keystroke data 710 is information generated when the user presses a key of a user terminal such as a smartphone. In more detail, the keystroke data 710 includes time information of when a key is pressed and released and sensor information collected from a plurality of sensors included in the user terminal while the user presses and releases the key. Here, the keystroke data 710 is a single piece of data.

In operation 702, the user classification apparatus 500 extracts feature information corresponding to a unique pattern of the user using the received keystroke data 710.

In operation 703, the user classification apparatus 500 performs clustering on the currently extracted feature information using the feature information extracted in operation 702 and trained cluster information 420.

The user classification apparatus 500 determines to which cluster the extracted feature information corresponds of a plurality of clusters using the trained cluster information 420.

The cluster information 420 is stored in a database included in the user classification apparatus 500 or an additional database.

In operation 704, the user classification apparatus 500 selects a keystroke profile corresponding to a cluster of a current user from a keystroke profile 430 for each cluster.

The user classification apparatus 500 classifies the user using the selected keystroke profile and the feature information extracted in operation 702. In more detail, the user classification apparatus 500 determines whether the extracted feature information is similar to a pattern of the selected keystroke profile.

Based on a result of the comparing that the extracted keystroke pattern of the user is similar to the pattern of the selected keystroke profile, a classification result 740 is the user currently inputting a key is a pre-trained user.

Based on the result of the comparing that the extracted keystroke pattern of the user is not similar to the pattern of the selected keystroke profile, the classification result 740 is the user currently inputting the key is not a pre-trained user.

According to embodiments, it is possible to train a keystroke pattern based on a user posture and a keystroke pattern based on a clustering in order to increase a success rate of user classification.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user classification method using a keystroke pattern in a mobile device, the method comprising:
 receiving keystroke data from a user when the user performs authentication of an application included in the mobile device;
 extracting feature information including data for a posture performed by the user when the user performs keystroke and data for a keystroke pattern using the received keystroke data;
 classifying the posture of the user by comparing the feature information to posture feature information, the posture feature information having been generated based on postures performed by general users, the postures including a walking posture, a sitting posture, and a lying-down posture;
 selecting a keystroke profile that corresponds to the classified posture of the user;
 comparing the feature information to a pattern of the selected keystroke profile;
 determining whether the user is a pre-trained user based on a result of the comparing; and
 authenticating the user to use the application based on a result of the determining.

2. The method of claim 1, wherein the keystroke data is generated when the user presses a key, and the keystroke data comprises time information of when a key is pressed and released and sensor information collected from an accelerometer sensor, a gyroscope sensor, and a proximity sensor during a time corresponding to the time information.

3. The method of claim 1, wherein the posture feature information has been generated independently from the pre-trained user.

4. A keystroke pattern training method comprising:
receiving keystroke data from a user when the user performs authentication of an application included in a mobile device;
extracting feature information including data for a posture performed by the user when the user performs keystroke and data for a keystroke pattern using the received keystroke data;
classifying the posture of the user by comparing the feature information to posture feature information, the posture feature information having been generated based on postures performed by general users, the postures including a walking posture, a sitting posture, and a lying-down posture; and
training the keystroke pattern for the classified posture of the user using the feature information.

5. The method of claim 4, further comprising storing the trained keystroke pattern for the classified posture in a form of a keystroke profile.

6. The method of claim 4, wherein the posture feature information has been generated based on one or more of walking posture, sitting posture, and lying down posture.

7. The method of claim 4, wherein the keystroke data is generated when the user presses a key, and the keystroke data comprises time information of when a key is pressed and released and sensor information collected during a time corresponding to the time information.

8. The method of claim 4, wherein the posture feature information has been generated independently from the user.

* * * * *